(12) United States Patent
Panusopone et al.

(10) Patent No.: US 9,948,930 B2
(45) Date of Patent: Apr. 17, 2018

(54) TEMPLATE MATCHING FOR JVET INTRA PREDICTION

(71) Applicant: ARRIS Enterprises LLC, Suwanee, GA (US)

(72) Inventors: Krit Panusopone, San Diego, CA (US); Limin Wang, San Diego, CA (US); Koohyar Minoo, San Diego, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 15/597,420

(22) Filed: May 17, 2017

(65) Prior Publication Data

US 2017/0339404 A1 Nov. 23, 2017

Related U.S. Application Data

(60) Provisional application No. 62/337,652, filed on May 17, 2016, provisional application No. 62/341,343, filed on May 25, 2016.

(51) Int. Cl.

| | |
|---|---|
| *H04N 19/107* | (2014.01) |
| *H04N 19/64* | (2014.01) |
| *H04N 19/91* | (2014.01) |
| *H04N 19/196* | (2014.01) |
| *H04N 19/105* | (2014.01) |
| *H04N 19/176* | (2014.01) |

(52) U.S. Cl.
CPC ......... *H04N 19/107* (2014.11); *H04N 19/647* (2014.11); *H04N 19/91* (2014.11); *H04N 19/105* (2014.11); *H04N 19/176* (2014.11); *H04N 19/197* (2014.11)

(58) Field of Classification Search
CPC .... H04N 19/107; H04N 19/647; H04N 19/91; H04N 19/105; H04N 19/176; H04N 19/197
USPC ...................................................... 375/240.12
See application file for complete search history.

(56) References Cited

FOREIGN PATENT DOCUMENTS

| | | |
|---|---|---|
| EP | 2101504 A2 | 9/2009 |
| WO | 2010090749 A1 | 8/2010 |
| WO | 2011068332 A2 | 6/2011 |

OTHER PUBLICATIONS

K. Suehring, and X. Li, "JVET common test conditions and software reference configurations," JVET-B1010, Feb. 2016.

(Continued)

*Primary Examiner* — Nguyen Truong
(74) *Attorney, Agent, or Firm* — Lori Anne D. Swanson

(57) ABSTRACT

A method of decoding JVET video, comprising defining a coding unit (CU) template within a decoded area of a video frame, the CU template being positioned above and/or to the left of a current decoding position for which data was intra predicted, defining a search window within the decoded area, the search window being adjacent to the CU template, generating a plurality of candidate prediction templates based on pixel values in the search window, each of the plurality of candidate prediction templates being generated using different intra prediction modes, calculating a matching cost between the CU template and each of the plurality of candidate prediction templates, selecting an intra prediction mode that generated the candidate prediction template that had the lowest matching cost relative to the CU template, and generating a prediction CU for the current decoding position based on the intra prediction mode.

6 Claims, 13 Drawing Sheets

(56) References Cited

OTHER PUBLICATIONS

J. Li, B. Li, J. Xu, R. Xiong, and G. Sullivan, "Multiple line-based intra prediction," JVET-00071, May 2016.
PCT Written Opinion and Search Report, PCT/US17/033060, dated Sep. 12, 2017.

TEMPLATE MATCHING FOR JVET INTRA PREDICTION

CLAIM OF PRIORITY

This application claims priority under 35 U.S.C. § 119(e) from earlier filed U.S. Provisional Application Ser. No. 62/337,652, filed May 17, 2016, and from earlier filed U.S. Provisional Application Ser. No. 62/341,343, filed May 25, 2016, both of which are hereby incorporated by reference.

TECHNICAL FIELD

The present disclosure relates to the field of video coding, particularly a template matching scheme for coding with intra prediction in JVET.

BACKGROUND

The technical improvements in evolving video coding standards illustrate the trend of increasing coding efficiency to enable higher bit-rates, higher resolutions, and better video quality. The Joint Video Exploration Team is developing a new video coding scheme referred to as JVET. Similar to other video coding schemes like HEVC (High Efficiency Video Coding), JVET is a block-based hybrid spatial and temporal predictive coding scheme. However, relative to HEVC, JVET includes many modifications to bitstream structure, syntax, constraints, and mapping for the generation of decoded pictures. JVET has been implemented in Joint Exploration Model (JEM) encoders and decoders.

SUMMARY

The present disclosure provides a method of decoding JVET video, the method comprising defining a coding unit (CU) template within a decoded area of a video frame, the CU template being positioned above and/or to the left of a current decoding position for which data was intra predicted, defining a search window within the decoded area, the search window being adjacent to the CU template, generating a plurality of candidate prediction templates based on pixel values in the search window, each of the plurality of candidate prediction templates being generated using different intra prediction modes, calculating a matching cost between the CU template and each of the plurality of candidate prediction templates, selecting an intra prediction mode that generated the candidate prediction template that had the lowest matching cost relative to the CU template, and generating a prediction CU for the current decoding position based on the intra prediction mode.

The present disclosure also provides a method of decoding JVET video, the method comprising defining a plurality of coding unit (CU) templates within a decoded area of a video frame, each of the CU templates being positioned above and/or to the left of a current decoding position for which data was intra predicted and being spaced apart from the current decoding position by a different number of reference lines, defining a search window within the decoded area for each of the plurality of CU templates, each search window being within an associated reference line, generating a plurality of candidate prediction templates for each of the plurality of CU templates based on pixel values in the search window associated with the CU template, each of the plurality of candidate prediction templates being generated using different intra prediction modes, calculating a matching cost between each of the plurality of CU templates and each of the plurality of candidate prediction templates, selecting an intra prediction mode that generated the candidate prediction template that had the lowest matching cost relative to one of the plurality of CU templates, and generating a prediction CU for the current decoding position based on the intra prediction mode.

The present disclosure also provides a method of decoding JVET video, the method comprising receiving a bitstream identifying a plurality of coding units (CUs), at least some of which were encoded with intra prediction, wherein the bitstream omits an indication of which intra prediction mode was used to encode those CUs, defining at least one CU template within a decoded area of a video frame, the at least one CU template being positioned above and/or to the left of a current decoding position for a coding unit encoded with intra prediction, defining at least one search window within the decoded area, the at least one search window being adjacent to the at least one CU template within the decoded area, generating a plurality of candidate prediction templates for the at least one CU template based on pixel values in the search window associated with the at least one CU template, each of the plurality of candidate prediction templates being generated using different intra prediction modes, calculating a matching cost between the at least one CU template and each of the plurality of candidate prediction templates, selecting an intra prediction mode that generated the candidate prediction template that had the lowest matching cost relative to the at least one CU template, generating a prediction CU for the current decoding position based on the intra prediction mode, decoding a reconstructed residual CU from the bitstream for the current decoding position, and generating a reconstructed CU by adding the prediction CU to the reconstructed residual CU.

BRIEF DESCRIPTION OF THE DRAWINGS

Further details of the present invention are explained with the help of the attached drawings in which.

DETAILED DESCRIPTION

Figure 1:
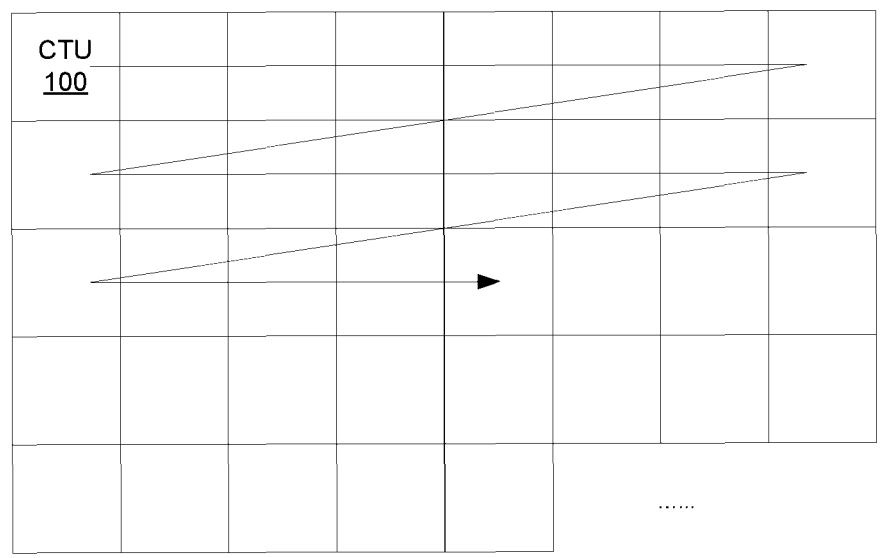
FIG. 1 depicts division of a frame into a plurality of Coding Tree Units (CTUs).

FIG. 1 depicts division of a frame into a plurality of Coding Tree Units (CTUs) 100. A frame can be an image in a video sequence, which may include a plurality of frames. A frame can include a matrix, or set of matrices, with pixel values representing intensity measures in the image. The pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Frames of a video sequence, or more specifically the coding tree units within each frame, can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme. During coding with JVET, a frame is first divided into square blocks called CTUs 100, as shown in FIG. 1. For example, CTUs 100 can be blocks of 128×128 pixels.

Figure 2:
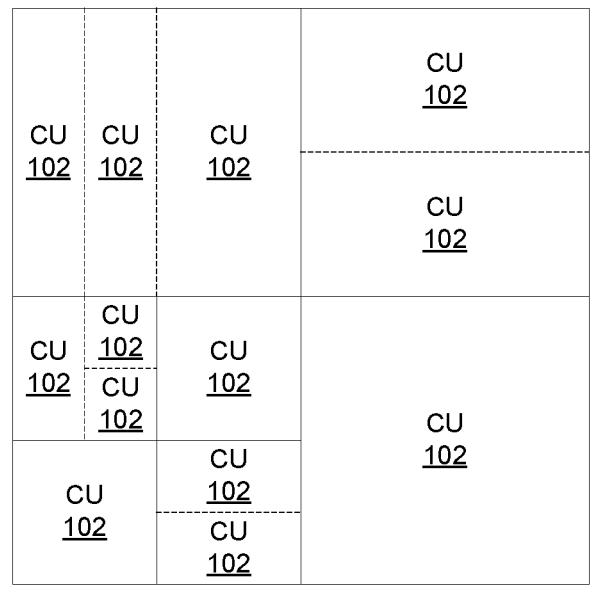
FIG. 2 depicts an exemplary partitioning of a CTU into Coding Units (CUs).

FIG. 2 depicts an exemplary partitioning of a CTU 100 into CUs 102, which are the basic units of prediction in coding. Each CTU 100 in a frame can be partitioned into one or more CUs (Coding Units) 102. CUs 102 can be used for prediction and transform as described below. Unlike HEVC, in JVET the CUs 102 can be rectangular or square, and can be coded without further partitioning into prediction units or transform units. The CUs 102 can be as large as their root CTUs 100, or be smaller subdivisions of a root CTU 100 as small as 4×4 blocks.

In JVET, a CTU 100 can be partitioned into CUs 102 according to a quadtree plus binary tree (QTBT) scheme in which the CTU 100 can be split into square blocks according to a quadtree, and those square blocks can then be split horizontally or vertically according to binary trees. Parameters can be set to control splitting according to the QTBT, such as the CTU size, the minimum sizes for the quadtree and binary tree leaf nodes, the maximum size for the binary tree root node, and the maximum depth for the binary trees.

By way of a non-limiting example, FIG. 2 shows a CTU 100 partitioned into CUs 102, with solid lines indicating quadtree splitting and dashed lines indicating binary tree splitting. As illustrated, the binary splitting allows horizontal splitting and vertical splitting to define the structure of the CTU and its subdivision into CUs.

Figure 3:
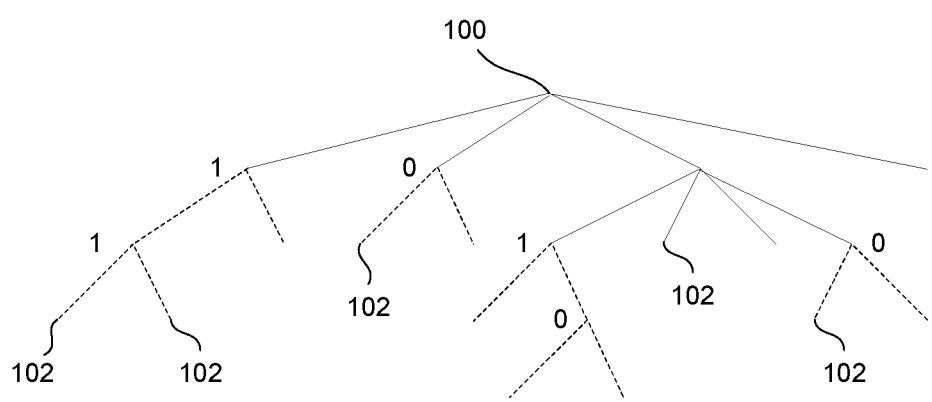
FIG. 3 depicts a quadtree plus binary tree (QTBT) representation of FIG. 2's CU partitioning.

FIG. 3 shows a QTBT representation of FIG. 2's partitioning. A quadtree root node represents the CTU 100, with each child node in the quadtree portion representing one of four square blocks split from a parent square block. The square blocks represented by the quadtree leaf nodes can then be divided symmetrically zero or more times using binary trees, with the quadtree leaf nodes being root nodes of the binary trees, representing the parent coding unit that is partitioned into two child coding units. At each level of the binary tree portion, a block can be divided symmetrically, either vertically or horizontally. A flag set to "0" indicates that the block is symmetrically split horizontally, while a flag set to "1" indicates that the block is symmetrically split vertically.

After quadtree splitting and binary tree splitting, the blocks represented by the QTBT's leaf nodes represent the final CUs 102 to be coded, such as coding using inter prediction or intra prediction. For slices or full frames coded with inter prediction, different partitioning structures can be used for luma and chroma components. For example, for an inter slice a CU 102 can have Coding Blocks (CBs) for different color components, such as such as one luma CB and two chroma CBs. For slices or full frames coded with intra prediction, the partitioning structure can be the same for luma and chroma components.

Figure 4:
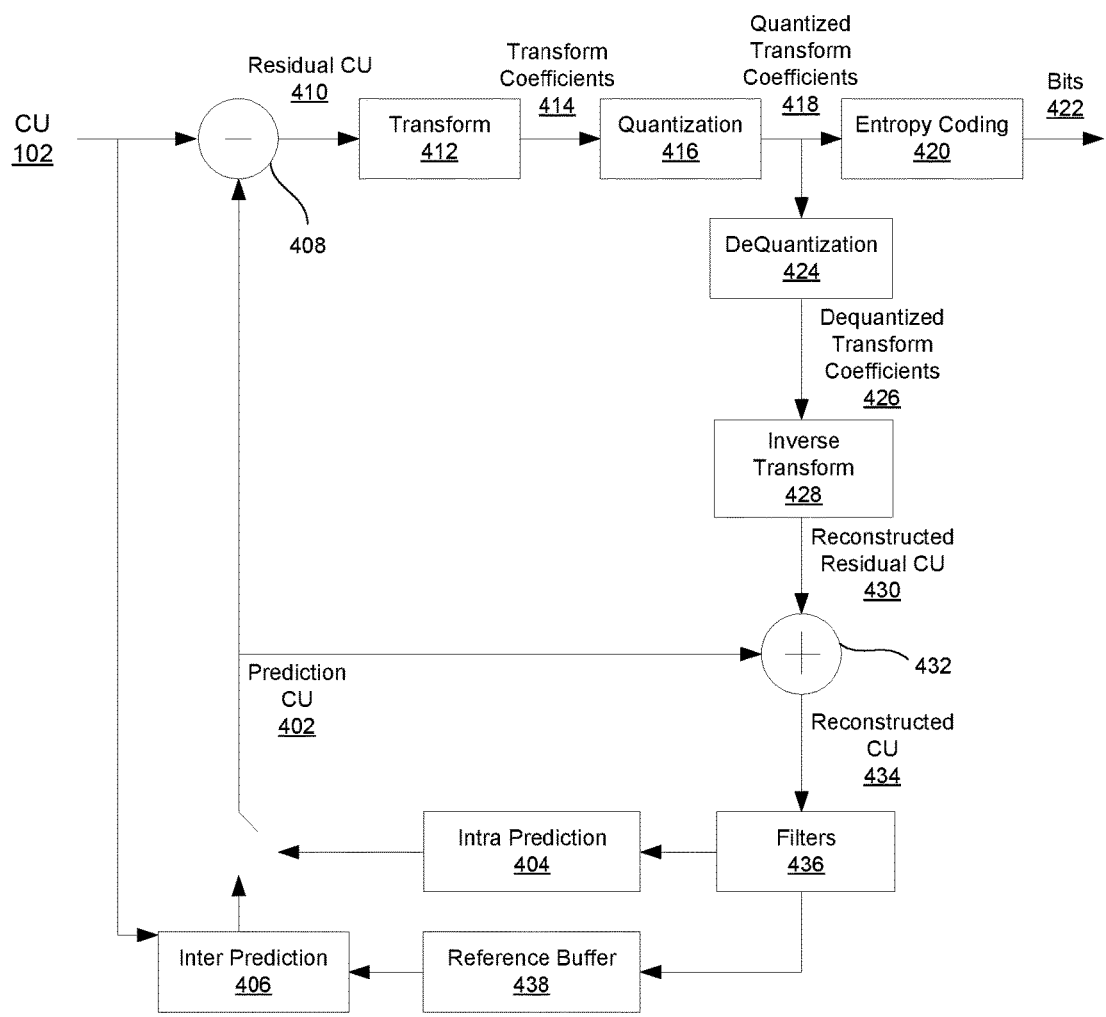
FIG. 4 depicts a simplified block diagram for CU coding in a JVET encoder.

FIG. 4 depicts a simplified block diagram for CU coding in a WET encoder. The main stages of video coding include partitioning to identify CUs 102 as described above, followed by encoding CUs 102 using prediction at 404 or 406, generation of a residual CU 410 at 408, transformation at 412, quantization at 416, and entropy coding at 420. The encoder and encoding process illustrated in FIG. 4 also includes a decoding process that is described in more detail below.

Given a current CU 102, the encoder can obtain a prediction CU 402 either spatially using intra prediction at 404 or temporally using inter prediction at 406. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A sequence of coding units may make up a slice, and one or more slices may make up a picture. A slice may include one or more slice segments, each in its own NAL unit. A slice or slice segment may include header information for the slice or bitstream.

A slice, such as an entire picture or a portion of a picture, coded entirely with intra-predicted CUs can be an I slice that can be decoded without reference to other slices, and as such can be a possible point where decoding can begin. A slice coded with at least some inter-predicted CUs can be a predictive (P) or bi-predictive (B) slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or inter-prediction using an interpolated prediction from two different frames, thus increasing the accuracy of the motion estimation process. In some cases P slices and B slices can also or alternately be encoded using intra block copy, in which data from other portions of the same slice is used.

As will be discussed below, intra prediction or inter prediction can be performed based on reconstructed CUs 434 from previously coded CUs 102, such as neighboring CUs 102 or CUs 102 in reference pictures.

When a CU 102 is coded spatially with intra prediction at 404, an intra prediction mode can be found that best predicts pixel values of the CU 102 based on samples from neighboring CUs 102 in the picture.

Figure 5:
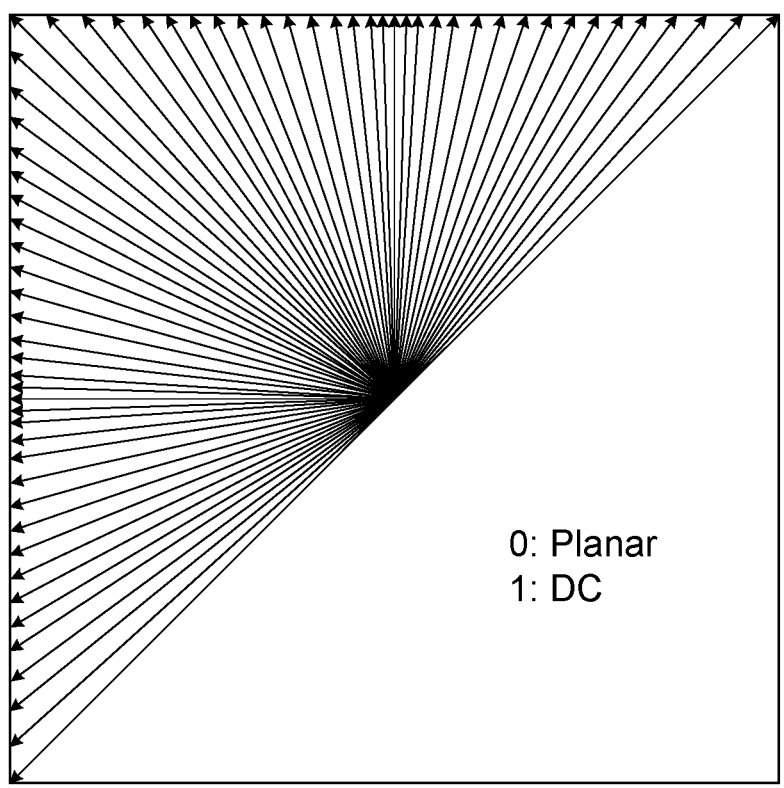
FIG. 5 depicts possible intra prediction modes for luma components in JVET.

When coding a CU's luma component, the encoder can generate a list of candidate intra prediction modes. While HEVC had 35 possible intra prediction modes for luma components, in JVET there are 67 possible intra prediction modes for luma components. These include a planar mode that uses a three dimensional plane of values generated from neighboring pixels, a DC mode that uses values averaged from neighboring pixels, and the 65 directional modes shown in FIG. 5 that use values copied from neighboring pixels along the indicated directions.

When generating a list of candidate intra prediction modes for a CU's luma component, the number of candidate modes on the list can depend on the CU's size. The candidate list can include: a subset of HEVC's 35 modes with the lowest SATD (Sum of Absolute Transform Difference) costs; new directional modes added for JVET that neighbor the candidates found from the HEVC modes; and modes from a set of six most probable modes (MPMs) for the CU 102 that are identified based on intra prediction modes used for previously coded neighboring blocks as well as a list of default modes.

When coding a CU's chroma components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU's luma and chroma components. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 402 can be smoothed further with a position dependent intra prediction combination (PDPC) process that adjusts a prediction CU 402 generated based on filtered samples of neighboring blocks using unfiltered samples of neighboring blocks, or adaptive reference sample smoothing using 3-tap or 5-tap low pass filters to process reference samples.

In some embodiments, syntax can be coded in the bitstream that indicates the intra prediction modes used to code each CU 102. However, as described below with respect to FIGS. 7-17, in other embodiments the encoder can save overhead in the bitstream by omitting information that indicates the intra prediction mode used to encode a CU 102, and a decoder can use template matching to generate a prediction block when decoding a CU 102 encoded with intra prediction.

When a CU 102 is coded temporally with inter prediction at 406, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at 1/16 pel, and the difference between a motion vector and a CU's predicted motion vector can be coded with either quarter-pel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 402 using those motion vectors. In some cases, when motion vectors have been found for individual sub-CUs, Overlapped Block Motion Compensation (OBMC) can be used when generating a prediction CU 402 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 402 generated with each of the two motion vectors can be found, and the two motion vectors can be refined by replacing them with new motion vectors that best point to the combined prediction CU 402. The two refined motion vectors can be used to generate the final prediction CU 402.

At 408, once a prediction CU 402 has been found with intra prediction at 404 or inter prediction at 406 as described above, the encoder can subtract the prediction CU 402 from the current CU 102 find a residual CU 410.

The encoder can use one or more transform operations at 412 to convert the residual CU 410 into transform coefficients 414 that express the residual CU 410 in a transform domain, such as using a discrete cosine block transform (DCT-transform) to convert data into the transform domain. WET allows more types of transform operations than HEVC, including DCT-II, DST-VII, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases a mode dependent non-separable secondary transform (MDNSST) can be applied to low frequency transform coefficients 414 after a forward core transform. The MDNSST operation can use a Hypercube-Givens Transform (HyGT) based on rotation data. When used, an index value identifying a particular MDNSST operation can be signaled by the encoder.

At 416, the encoder can quantize the transform coefficients 414 into quantized transform coefficients 416. The quantization of each coefficient may be computed by dividing a value of the coefficient by a quantization step, which is derived from a quantization parameter (QP). In some embodiments, the Qstep is defined as $2^{(QP-4)/6}$. Because high precision transform coefficients 414 can be converted into quantized transform coefficients 416 with a finite number of possible values, quantization can assist with data compression. Thus, quantization of the transform coefficients may limit an amount of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET can utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 420, the encoder can find final compression bits 422 by entropy coding the quantized transform coefficients 418. Entropy coding aims to remove statistical redundancies of the information to be transmitted. In JVET, CABAC (Context Adaptive Binary Arithmetic Coding) can be used to code the quantized transform coefficients 418, which uses probability measures to remove the statistical redundancies. For CUs 102 with non-zero quantized transform coefficients 418, the quantized transform coefficients 418 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin1, and bin2), an index value that indicates which context model to use for the bin can be found by finding the sum of that bin position in up to five previously coded neighboring quantized transform coefficients 418 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in NET the probabilities of context models for new inter-predicted pictures can be initialized based on context models developed for previously coded inter-predicted pictures.

The encoder can produce a bitstream that contains entropy encoded bits 422 of residual CUs 410, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below. As described below with respect to FIGS. 7-17, in some embodiments the encoder can save overhead in the bitstream by omitting information from the bitstream that indicates which intra prediction modes were used to encode CUs 102, and the decoder can use template matching when decoding CUs 102 encoded with intra prediction.

In addition to using the quantized transform coefficients 418 to find the final compression bits 422, the encoder can also use the quantized transform coefficients 418 to generate reconstructed CUs 434 by following the same decoding process that a decoder would use to generate reconstructed CUs 434. Thus, once the transformation coefficients have been computed and quantized by the encoder, the quantized transform coefficients 418 may be transmitted to the decoding loop in the encoder. After quantization of a CU's transform coefficients, a decoding loop allows the encoder to generate a reconstructed CU 434 identical to the one the decoder generates in the decoding process. Accordingly, the encoder can use the same reconstructed CUs 434 that a decoder would use for neighboring CUs 102 or reference pictures when performing intra prediction or inter prediction for a new CU 102. Reconstructed CUs 102, reconstructed slices, or full reconstructed frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 426. For example, in the decoding process shown in FIG. 4 in the encoder, the quantized transform coefficients 418 of a residual CU 410 can be dequantized at 424 to find dequantized transform coefficients 426. If an MDNSST operation was performed during encoding, that operation can be reversed after dequantization.

At 428, the dequantized transform coefficients 426 can be inverse transformed to find a reconstructed residual CU 430, such as by applying a DCT to the values to obtain the reconstructed image. At 432 the reconstructed residual CU 430 can be added to a corresponding prediction CU 402 found with intra prediction at 404 or inter prediction at 406, in order to find a reconstructed CU 434. While in some embodiments the encoder can perform intra prediction at 404 as described above, in other embodiments the encoder can follow the process described below with respect to FIGS. 7-17 for intra prediction template matching to generate a prediction CU 402 in the same way that a decoder would use template matching for intra prediction if information identifying the intra prediction mode used for the CU 102 is omitted from the bitstream.

At 436, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled.

If reconstructed pictures are reference pictures, they can be stored in a reference buffer 438 for inter prediction of future CUs 102 at 406.

During the above steps, JVET allows a content adaptive clipping operations to be used to adjust color values to fit between lower and upper clipping bounds. The clipping bounds can change for each slice, and parameters identifying the bounds can be signaled in the bitstream.

Figure 6:
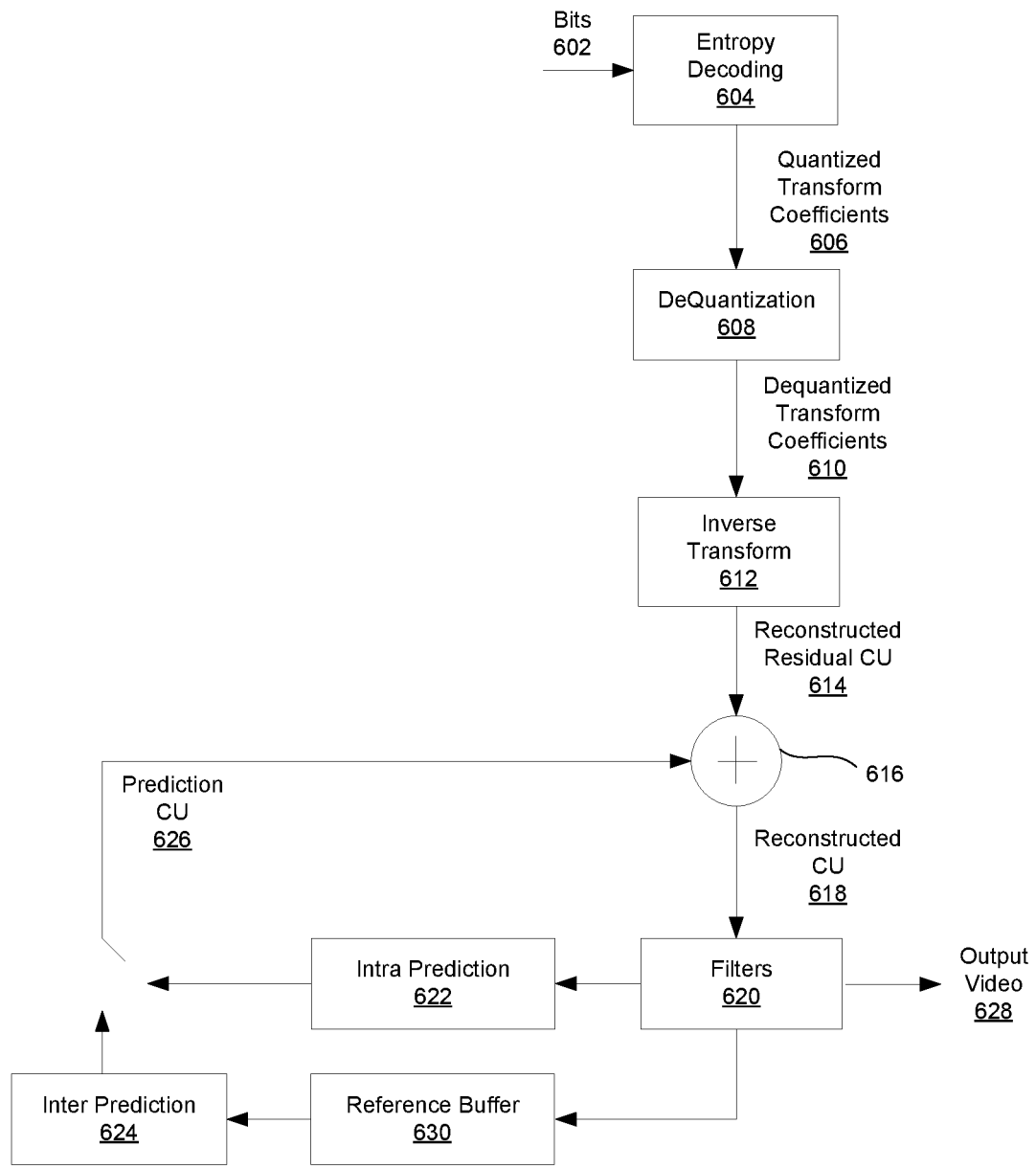
FIG. 6 depicts a simplified block diagram for CU coding in a JVET decoder.

FIG. 6 depicts a simplified block diagram for CU coding in a JVET decoder. A JVET decoder can receive a bitstream containing information about encoded CUs 102. The bitstream can indicate how CUs 102 of a picture were partitioned from a CTU 100 according to a QTBT structure. By way of a non-limiting example, the bitstream can identify how CUs 102 were partitioned from each CTU 100 in a QTBT using quadtree partitioning, symmetric binary partitioning, and/or asymmetric binary partitioning. The bitstream can also indicate prediction information for the CUs 102 such as intra prediction modes or motion vectors, and bits 602 representing entropy encoded residual CUs. In some embodiments the encoder can have omitted information in the bitstream about intra prediction modes used to encode some or all CUs 102 coded using intra prediction, and as such the decoder can use template matching for intra prediction as described below with respect to FIGS. 7-17.

At 604 the decoder can decode the entropy encoded bits 602 using the CABAC context models signaled in the bitstream by the encoder. The decoder can use parameters signaled by the encoder to update the context models' probabilities in the same way they were updated during encoding.

After reversing the entropy encoding at 604 to find quantized transform coefficients 606, the decoder can dequantize them at 608 to find dequantized transform coefficients 610. If an MDNSST operation was performed during encoding, that operation can be reversed by the decoder after dequantization.

At 612, the dequantized transform coefficients 610 can be inverse transformed to find a reconstructed residual CU 614. At 616, the reconstructed residual CU 614 can be added to a corresponding prediction CU 626 found with intra prediction at 622 or inter prediction at 624, in order to find a reconstructed CU 618. As described below with respect to FIGS. 7-17, in some embodiments the decoder can find the prediction CU 626 using template matching for intra prediction.

At 620, one or more filters can be applied to the reconstructed data, at either a picture level or CU level. For example, the decoder can apply a deblocking filter, a sample adaptive offset (SAO) filter, and/or an adaptive loop filter (ALF). As described above, the in-loop filters located in the decoding loop of the encoder may be used to estimate optimal filter parameters to increase the objective and subjective quality of a frame. These parameters are transmitted to the decoder to filter the reconstructed frame at 620 to match the filtered reconstructed frame in the encoder.

After reconstructed pictures have been generated by finding reconstructed CUs 618 and applying signaled filters, the decoder can output the reconstructed pictures as output video 628. If reconstructed pictures are to be used as reference pictures, they can be stored in a reference buffer 630 for inter prediction of future CUs 102 at 624.

While in some embodiments the bitstream received by a JVET decoder can include syntax identifying which intra prediction mode was used to encode a CU 102 with intra prediction, such that the decoder can directly use the signaled intra prediction mode at 622 to generate a prediction CU 626, in other embodiments such syntax can be omitted to save overhead by reducing the number of bits in the bitstream. In these embodiments, when the decoder is not provided with an indication of which intra prediction mode was used to encode a CU 102, the decoder can use template matching for intra prediction at 622 to derive the intra prediction mode it should use to generate a prediction CU 626. In some embodiments an encoder can similarly use template matching for intra prediction at 404 when generating a prediction CU 402 to combine with a reconstructed residual CU 430 at 432 within its decoding loop.

Figure 7:
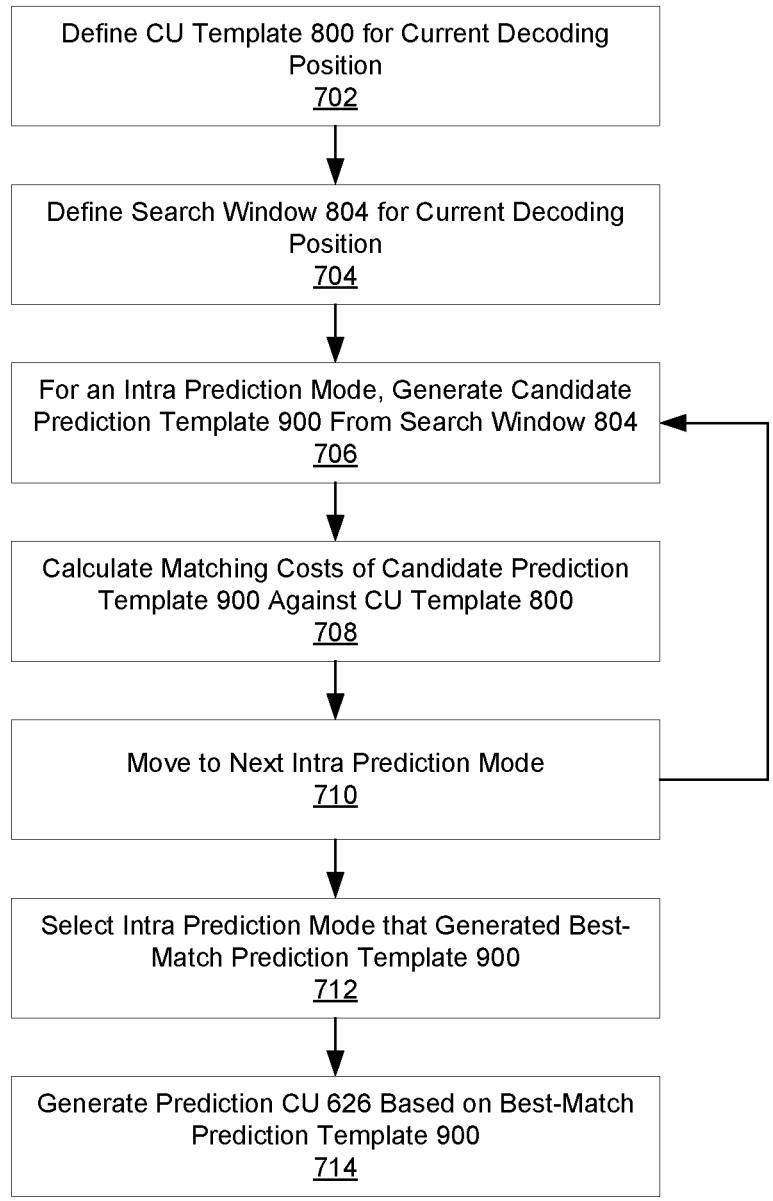
FIG. 7 depicts a first method of using template matching for intra prediction to generate a prediction CU at a decoder.

FIG. 7 depicts a first method of using template matching for intra prediction to generate a prediction CU 626 at a decoder. An encoder can use a substantially similar process to generate a prediction CU 402 in its decoding loop using only information that would be available to a decoder.

Figure 8:
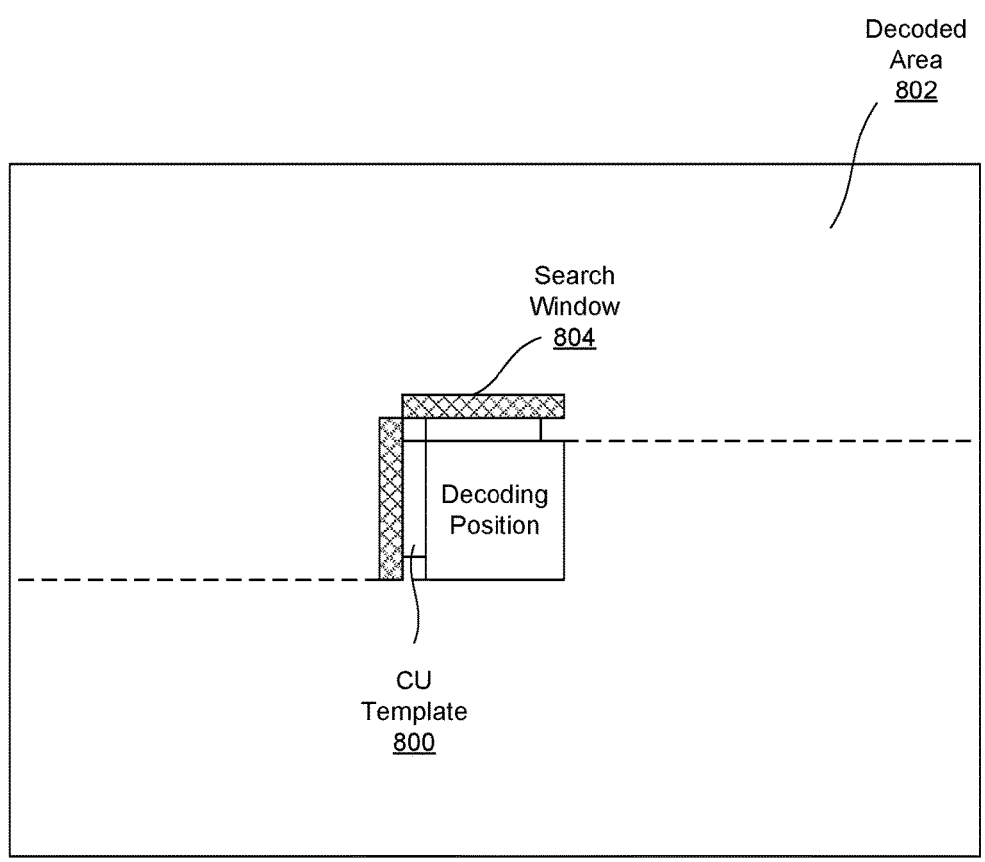
FIG. 8 depicts an example of a CU template and search window being defined for a current decoding position.

At step 702, the decoder can define a CU template 800 within a decoded area 802 of a frame or slice, as shown in FIG. 8. A decoder can define a CU template 800 proximate to the current decoding position, the position at which a prediction CU 626 is to be generated and then added to a reconstructed residual CU 614 to find a reconstructed CU 618. Because decoding can be performed in raster order, pixels above and/or to the left of the current decoding position in the same frame or slice can have already been decoded. As such, the CU template 800 for the current decoding position can comprise previously decoded pixels within a decoded area 802 of the same frame or slice, from above and/or to the left of the current decoding position.

The CU template 800 can have any size and shape. By way of a non-limiting example, FIG. 8 depicts a CU template 800 that is shaped with a row immediately above the current decoding position and a column immediately to the left of the current decoding position. In some embodiments the CU template's row above the current decoding position can be one pixel high and have a width that is one pixel less than the width of the current decoding position, while the CU template's column to the left of the current decoding position can be one pixel wide and have a height that is one pixel less than the height of the current decoding position. In other embodiments the CU template's row and/or column can extend along the full width and/or height of the current decoding position, or have any other dimensions. By way of a non-limiting example, in other embodiments a CU template 800 can have rows of two or more pixels above the current decoding position and columns of two or more pixels to the left of the current decoding position. In alternate embodiments a CU template 800 can have any other shape, and/or be positioned elsewhere within the decoded area 802 of the same frame or slice.

At step 704, the decoder can define a search window 804 within the decoded area 802 of a frame or slice, as shown in FIG. 8. The search window 804 can have a shape substantially similar to the CU template 800, with a row and column that is at least one pixel longer at each end than the CU template's row and column. The search window 804 can be adjacent to the CU template 800, but be positioned farther into the decoded area away from the current decoding position. By way of a non-limiting example, the search window 804 shown in FIG. 8 has a row of pixels immediately above the CU template's row of pixels, and a column of pixels immediately to the left of the CU template's column. The row of the search window 804 shown in FIG. 8 is two pixels longer than the CU template's row, such that it extends past both ends of the CU template's row. Similarly, the column of the search window 804 shown in FIG. 8 is two pixels longer than the CU template's row, such that it extends past both ends of the CU template's column.

Figure 9:
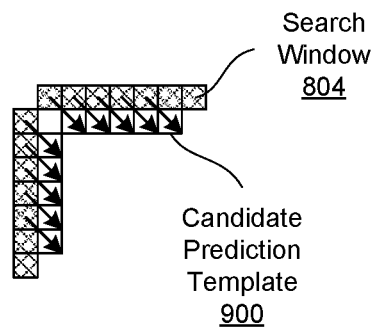
FIG. 9 depicts an example of a candidate prediction template being defined for a current decoding position.

At step 706, the decoder can generate a candidate prediction template 900 from the pixels of the search window 804 using one of the 67 JVET intra prediction modes, as shown in FIG. 9. As described above, JVET intra prediction modes can include a planar mode, a DC mode, and the 65 directional modes shown in FIG. 5. The candidate prediction template 900 can be the same size and shape as the CU template 800. By way of a non-limiting example, FIG. 9 depicts a candidate prediction template 900 being generated with pixel values derived from pixel values of the search window 804 according to a directional intra prediction mode.

Figure 10:
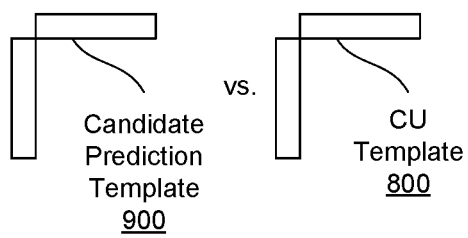
FIG. 10 depicts an example comparing a candidate prediction template against a CU template.

At step 708, the decoder can calculate matching costs between pixel values of the candidate prediction template 900 and the actual CU template 800, as shown in FIG. 10. In some embodiments the decoder can determine the sum of absolute differences (SAD) between the candidate prediction template 900 and the CU template 800. In other embodiments the decoder can calculate matching costs between the candidate prediction template 900 and the CU template 800 using the sum of absolute transformed differences (SATD), the sum of squared differences (SSD), rate-distortion optimization (RDO), or any other comparison metric. In some embodiments the decoder can compare values of all corresponding pixels within the candidate prediction template 900 and CU template 800, while in other embodiments the decoder can compare values of a subset of the pixels within the candidate prediction template 900 and CU template 800.

At step 710, the decoder can move to a different intra prediction mode and return to steps 706 and 708 to generate a new candidate prediction template 900 for that intra prediction mode and then calculate a matching cost between that candidate prediction template 900 and the CU template 800. The decoder can repeat this process until it has reviewed matching costs for candidate prediction templates 900 for some or all of the JVET intra prediction modes. By way of a non-limiting example, in some embodiments the decoder can be set to find matching costs for candidate prediction templates 900 generated according to a subset of the JVET intra prediction modes, such as the 35 intra prediction modes also used for HEVC. After determining matching costs between the CU template 800 and candidate prediction template 900 generated based on each intra prediction mode under consideration, the decoder can move to step 712.

At step 712, the decoder can select the intra prediction mode that generated the candidate prediction template 900 that best matched the actual CU template 800, based on the matching costs calculated during step 708. By way of a non-limiting example, the decoder can find the intra prediction mode associated with the candidate prediction template 900 with the lowest SAD matching cost relative to the CU template 800.

Figure 11:
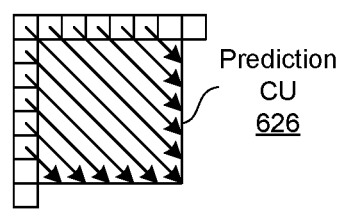
FIG. 11 depicts an example of generating a prediction CU from neighboring pixels using an intra prediction mode selected according to the method of FIG. 7.

At step 714, the decoder can use the intra prediction mode selected during step 712 to generate a prediction CU 626 with intra prediction, as shown in FIG. 11. The selected intra prediction mode can be applied based on pixel values of the CU template 800 and/or other pixels in the row and/or column that directly neighbor the current decoding position, such that pixel values for the prediction CU 626 can be derived from the neighboring pixels according to the selected intra prediction mode.

The prediction CU 626 generated with the process of FIG. 7 can be added to a reconstructed residual CU 614 to obtain a reconstructed CU 618. As described above, that reconstructed CU 618 that can be filtered at 620 and used to generate output video 628. The pixels of the reconstructed CU 618 can also be added to the decoded area 802 for use when decoding additional decoding positions in the frame or slice.

Figure 12:
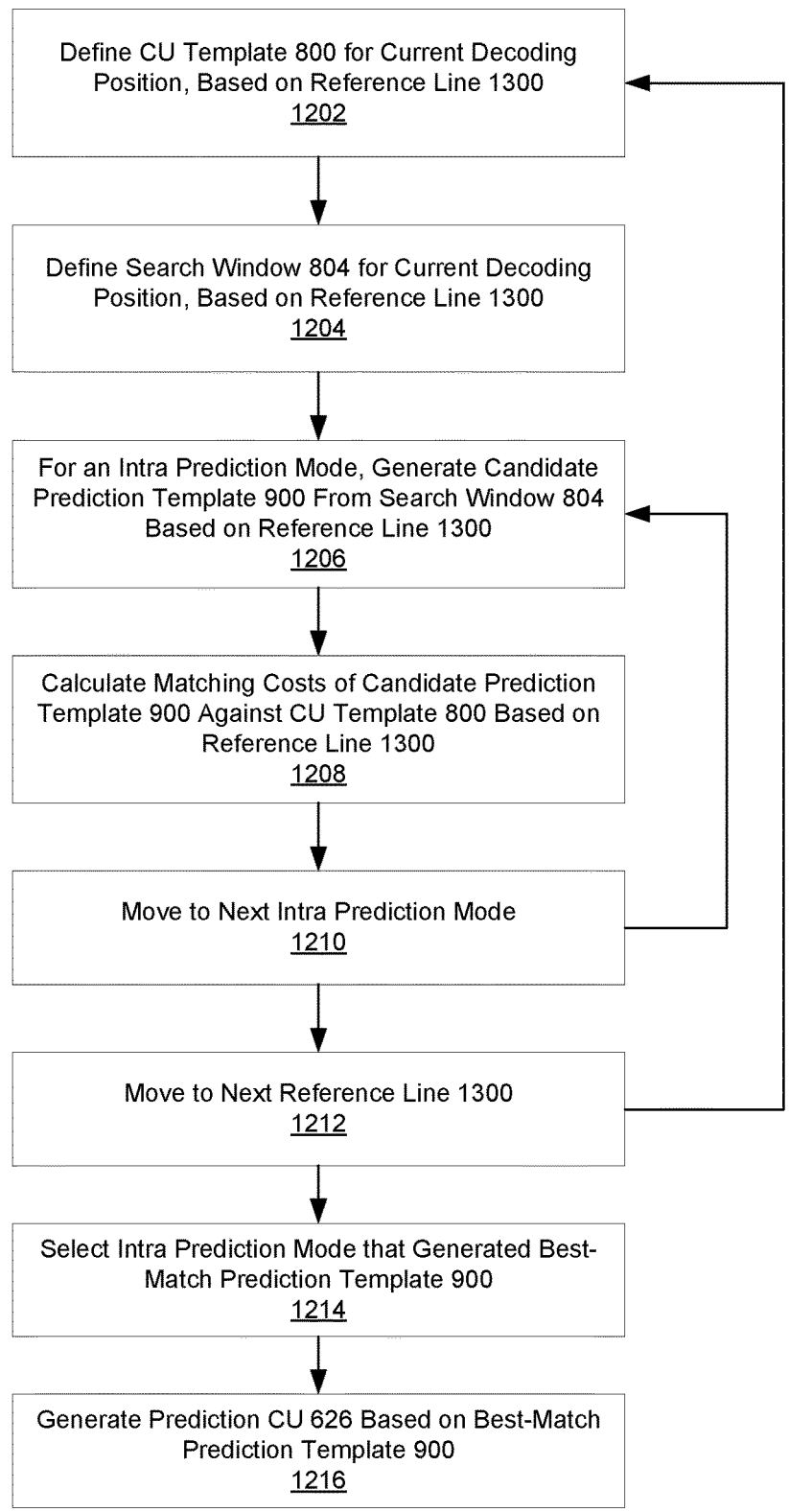
FIG. 12 depicts a second method of using template matching for intra prediction to generate a prediction CU at a decoder.
Figure 13:
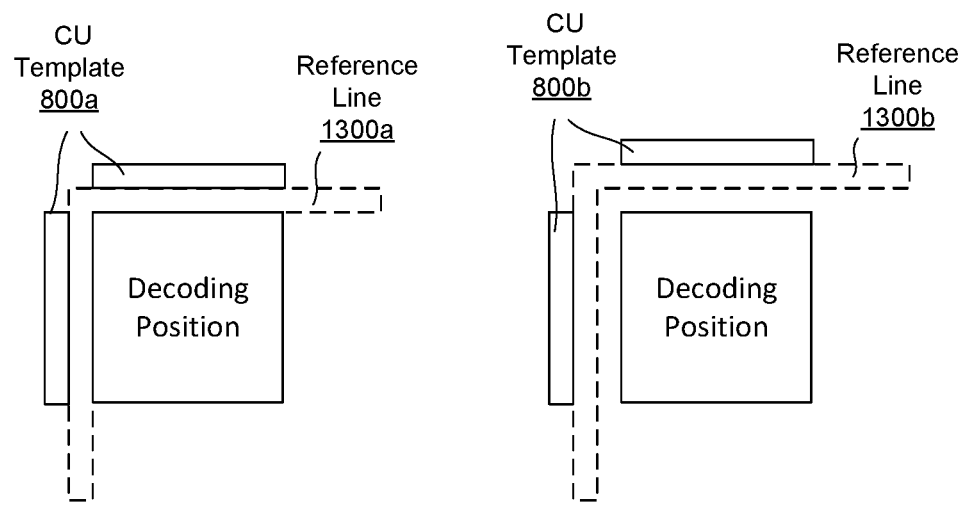
FIG. 13 depicts an example of different reference lines associated with a decoding position.

FIG. 12 depicts a second method of using template matching for intra prediction to generate a prediction CU 626 at a decoder. The method shown in FIG. 12 uses a plurality of CU templates 800 and candidate prediction templates 900 generated based on different reference lines 1300. As shown in FIG. 13, each reference line 1300 can indicate a different distance into the search window 804 above and/or to the left of the current decoding position. An encoder can use a substantially similar process to generate a prediction CU 402 in its decoding loop using only information that would be available to a decoder.

At step 1202, the decoder can define a CU template 800 based on a particular reference line 1300. As shown in FIG. 13, the different CU templates 800 can be defined for the same decoding position based on different reference lines 1300 outside the decoding position. Each reference line 1300 can indicate a different distance into the decoded area 802 away from the current decoding position, with the associated CU template's row and column being positioned one pixel farther into the decoded area 802 beyond the reference line 1300. By way of a non-limiting example, as shown in FIG. 13 a CU template 800a associated with reference line 1300a is positioned within a row and column two pixels away from the top and left of the decoding position, while a CU template 800b associated with reference line 1300b is positioned within a row and column three pixels away from the top and left of the same decoding position.

As shown in FIG. 13, in some embodiments the CU templates 800 can be one-pixel rows and columns that have the same width and height as the current decoding position, but be spaced apart from the current decoding position by one or more reference lines 1300. In alternate embodiments the CU templates 800 can have any other size, but have their shape and/or positions dependent on an associated reference line 1300.

Figure 14:
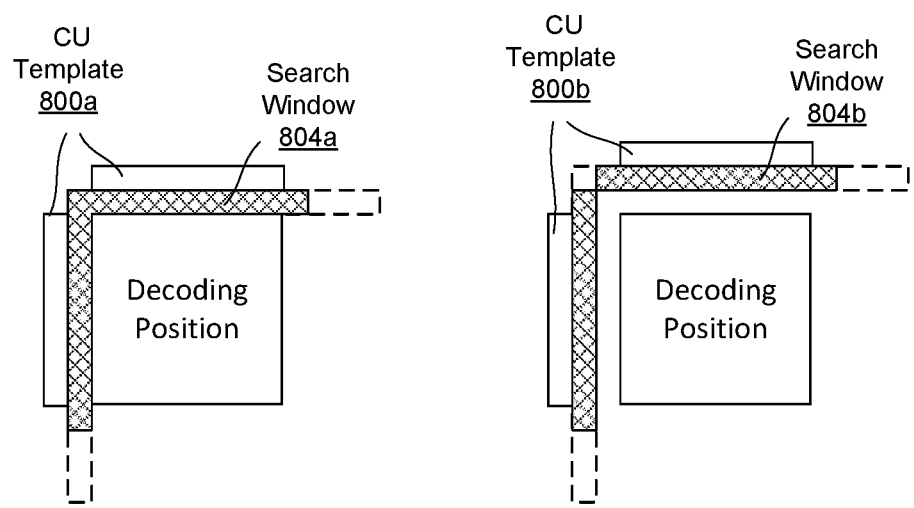
FIG. 14 depicts an example of different CU templates and search windows being defined for a current decoding position based on different reference lines.

At step 1204, the decoder can define a search window 804 within the same reference line 1300 that was used to define the CU template 800, as shown in FIG. 14. The search window 804 can have a shape substantially similar to the CU template 800, with a row and column that is at least one pixel longer at each end than the CU template's row and column. By way of a non-limiting example, the search windows 804 shown in FIG. 14 have rows and columns of pixels within associated reference line 1300, between the CU templates 800 and the current decoding position. The rows of the search windows 804 shown in FIG. 14 are each two pixels longer than the associated CU template's row, such that they extend past both ends of the CU templates' rows. Similarly, the columns of the search windows 804 shown in FIG. 8 are each two pixels longer than the associated CU template's row, such that they extend past both ends of the CU templates' columns.

Figure 15:
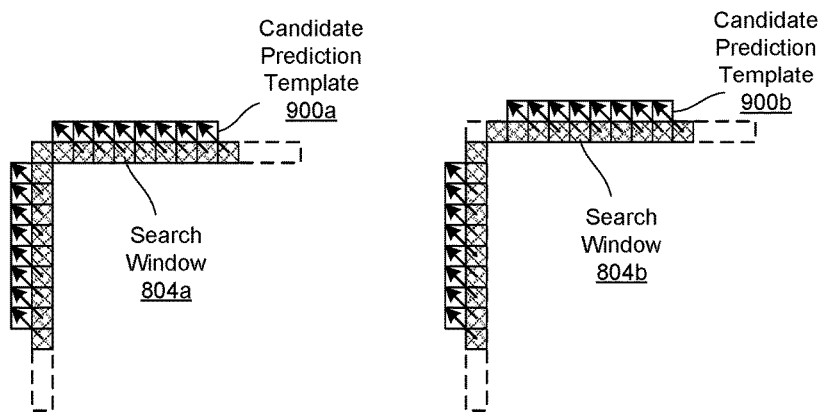
FIG. 15 depicts an example of different candidate prediction templates being defined for a current decoding position based on different reference lines.

At step 1206, the decoder can generate a candidate prediction template 900 from the pixels of the search window 804 using one of the 67 JVET intra prediction modes, as shown in FIG. 15. As described above, JVET intra prediction modes can include a planar mode, a DC mode, and the 65 directional modes shown in FIG. 5. The candidate prediction template 900 can be the same size and shape as the CU template 800 defined for the current reference line 1300. By way of a non-limiting example, FIG. 15 depicts a candidate prediction template 900a being generated with pixel values derived from pixel values of search window 804a associated with reference line 1300a according to a directional intra prediction mode, and a candidate prediction template 900b being generated with pixel values derived from pixel values of search window 804b associated with reference line 1300b according to a directional intra prediction mode.

Figures 16, 17:
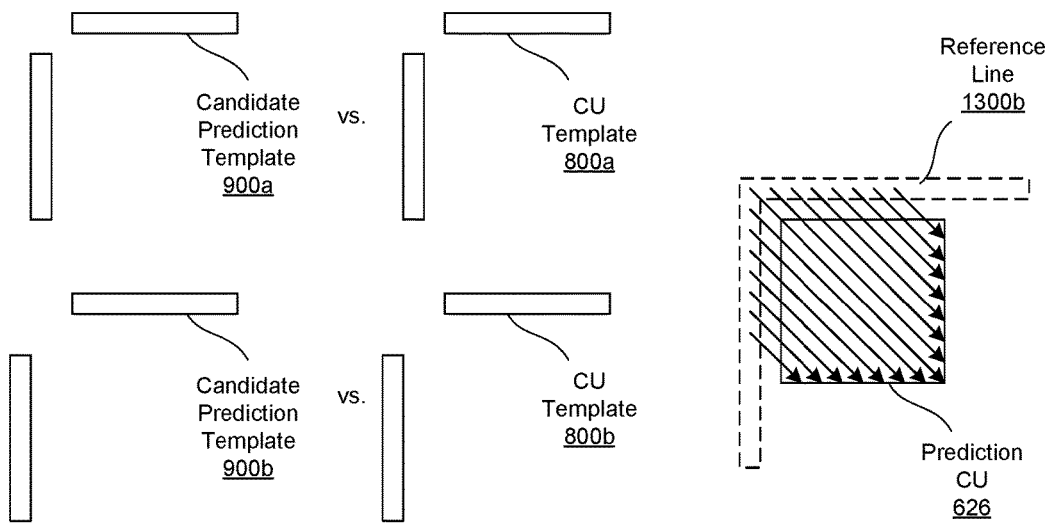
FIG. 16 depicts an example comparing different candidate prediction templates against different CU templates based on different reference lines.
FIG. 17 depicts an example of generating a prediction CU from pixels of a reference line using an intra prediction mode selected according to the method of FIG. 12.

At step 1208, the decoder can calculate matching costs between pixel values of the candidate prediction template 900 and the CU template 800 associated with the current reference line 1300, as shown in FIG. 16. In some embodiments the decoder can determine the sum of absolute differences (SAD) between the candidate prediction template 900 and the CU template 800. In other embodiments the decoder can calculate matching costs between the candidate prediction template 900 and the CU template 800 using the sum of absolute transformed differences (SATD), the sum of squared differences (SSD), rate-distortion optimization (RDO), or any other comparison metric. In some embodiments the decoder can compare values of all corresponding pixels within the candidate prediction template 900 and CU template 800, while in other embodiments the decoder can compare values of a subset of the pixels within the candidate prediction template 900 and CU template 800.

At step 1210, the decoder can move to a different intra prediction mode and return to steps 1206 and 108 to generate a new candidate prediction template 900 for that intra prediction mode based on the current reference line 1300, and then calculate a matching cost between that candidate prediction template 900 and the CU template 800 associated with the reference line 1300. The decoder can repeat this process until it has reviewed matching costs for candidate prediction templates 900 for some or all of the JVET intra prediction modes, based on the same reference line 1300.

At step 1212, after determining matching costs between the CU template 800 and candidate prediction template 900 generated based on each intra prediction mode under consideration for a particular reference line, the decoder can move to the next reference line 1300 and repeat steps 1202 through 1210 for that reference line 1300. By way of a non-limiting example, FIG. 16 depicts a decoder considering different candidate prediction templates 900a for CU template 800a defined based on reference line 1300a, and later considering different candidate prediction templates 900b for CU template 800b defined based on reference line 1300b.

While FIG. 12 depicts the decoder performing steps in a smaller loop associated with reviewing multiple candidate prediction templates 900 against a CU template defined for a particular reference line 1300 and then repeating those steps in a larger loop for subsequent reference lines 1300, in alternate embodiments the decoder can perform each step for different reference lines 1300 before moving on to subsequent steps.

The decoder can repeat steps 1202-1210 for some or all possible reference lines 1300. By way of a non-limiting example, in some embodiments the decoder can be set to consider CU templates 800 and matching candidate prediction templates 900 based on a preset number of reference lines 1300. In alternate embodiments the encoder can signal a particular reference line 1300 in the bitstream, and the decoder can review candidate prediction templates 900 associated with the signaled reference line against the CU template 800 associated with the signaled reference line. Accordingly, in these embodiments the decoder can perform steps 1202 through 1210 for a single signaled reference line 1300.

At step 1214, the decoder can select the intra prediction mode that generated the candidate prediction template 900 that best matched one of the actual CU templates 800, based on the matching costs calculated during step 1208. By way of a non-limiting example, the decoder can find a combination of a candidate prediction template 900 and a CU template 800 associated with the same reference line that resulted in the lowest SAD matching cost, and select the intra prediction mode that generated that best-match candidate prediction mode 900 as the intra prediction mode to use to generate a prediction template 626.

At step 1216, the decoder can use the intra prediction mode selected during step 1214 to generate a prediction CU 626 with intra prediction. In some embodiments the decoder can apply the selected intra prediction mode based on the row and/or column of pixels that directly neighbor the current decoding position, as shown in FIG. 11. In other embodiments the decoder can apply the selected intra prediction mode based on pixels in the reference line 1300 from which the selected intra prediction mode was derived. By way of a non-limiting example, FIG. 17 depicts a prediction CU 626 being generated from pixels in reference line 1300b.

The prediction CU 626 generated with the process of FIG. 12 can be added to a reconstructed residual CU 614 to obtain a reconstructed CU 618. As described above, that reconstructed CU 618 that can be filtered at 620 and used to generate output video 628. The pixels of the reconstructed CU 618 can also be added to the decoded area 802 for use when decoding additional decoding positions in the frame or slice.

Figure 18:
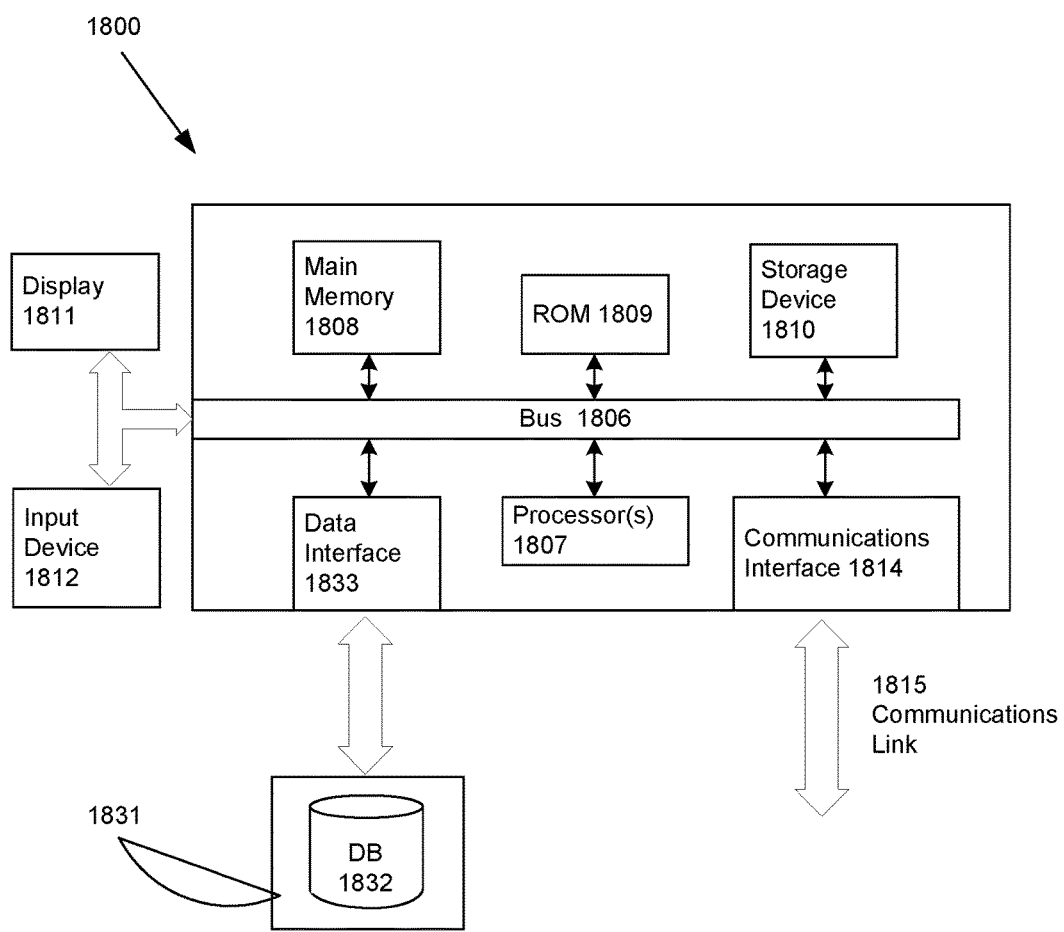
FIG. 18 depicts an embodiment of a computer system adapted and configured to perform template matching for JVET intra predication.

The execution of the sequences of instructions required to practice the embodiments can be performed by a computer system 1800 as shown in FIG. 18. In an embodiment, execution of the sequences of instructions is performed by a single computer system 1800. According to other embodiments, two or more computer systems 1800 coupled by a communication link 1815 can perform the sequence of instructions in coordination with one another. Although a description of only one computer system 1800 will be presented below, however, it should be understood that any number of computer systems 1800 can be employed to practice the embodiments.

A computer system 1800 according to an embodiment will now be described with reference to FIG. 18, which is a block diagram of the functional components of a computer system 1800. As used herein, the term computer system 1800 is broadly used to describe any computing device that can store and independently run one or more programs.

Each computer system 1800 can include a communication interface 1814 coupled to the bus 1806. The communication interface 1814 provides two-way communication between computer systems 1800. The communication interface 1814 of a respective computer system 1800 transmits and receives electrical, electromagnetic or optical signals, that include data streams representing various types of signal information, e.g., instructions, messages and data. A communication link 1815 links one computer system 1800 with another computer system 1800. For example, the communication link 1815 can be a LAN, in which case the communication interface 1814 can be a LAN card, or the communication link 1815 can be a PSTN, in which case the communication interface 1814 can be an integrated services digital network (ISDN) card or a modem, or the communication link 1815 can be the Internet, in which case the communication interface 1814 can be a dial-up, cable or wireless modem.

A computer system 1800 can transmit and receive messages, data, and instructions, including program, i.e., application, code, through its respective communication link 1815 and communication interface 1814. Received program code can be executed by the respective processor(s) 1807 as it is received, and/or stored in the storage device 1810, or other associated non-volatile media, for later execution.

In an embodiment, the computer system 1800 operates in conjunction with a data storage system 1831, e.g., a data storage system 1831 that contains a database 1832 that is readily accessible by the computer system 1800. The computer system 1800 communicates with the data storage system 1831 through a data interface 1833. A data interface 1833, which is coupled to the bus 1806, transmits and receives electrical, electromagnetic or optical signals, that include data streams representing various types of signal information, e.g., instructions, messages and data. In embodiments, the functions of the data interface 1833 can be performed by the communication interface 1814.

Computer system 1800 includes a bus 1806 or other communication mechanism for communicating instructions, messages and data, collectively, information, and one or more processors 1807 coupled with the bus 1806 for processing information. Computer system 1800 also includes a main memory 1808, such as a random access memory (RAM) or other dynamic storage device, coupled to the bus 1806 for storing dynamic data and instructions to be executed by the processor(s) 1807. The main memory 1808 also can be used for storing temporary data, i.e., variables, or other intermediate information during execution of instructions by the processor(s) 1807.

The computer system 1800 can further include a read only memory (ROM) 1809 or other static storage device coupled to the bus 1806 for storing static data and instructions for the processor(s) 1807. A storage device 1810, such as a magnetic disk or optical disk, can also be provided and coupled to the bus 1806 for storing data and instructions for the processor(s) 1807.

A computer system 1800 can be coupled via the bus 1806 to a display device 1811, such as, but not limited to, a cathode ray tube (CRT) or a liquid-crystal display (LCD) monitor, for displaying information to a user. An input device 1812, e.g., alphanumeric and other keys, is coupled to the bus 1806 for communicating information and command selections to the processor(s) 1807.

According to one embodiment, an individual computer system 1800 performs specific operations by their respective processor(s) 1807 executing one or more sequences of one or more instructions contained in the main memory 1808. Such instructions can be read into the main memory 1808 from another computer-usable medium, such as the ROM 1809 or the storage device 1810. Execution of the sequences of instructions contained in the main memory 1808 causes the processor(s) 1807 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1807. Such a medium can take many forms, including, but not limited to, non-volatile, volatile and transmission media. Non-volatile media, i.e., media that can retain information in the absence of power, includes the ROM 1809, CD ROM, magnetic tape, and magnetic discs. Volatile media, i.e., media that can not retain information in the absence of power, includes the main memory 1808. Transmission media includes coaxial cables, copper wire and fiber optics, including the wires that comprise the bus 1806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof.

It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Figure 19:
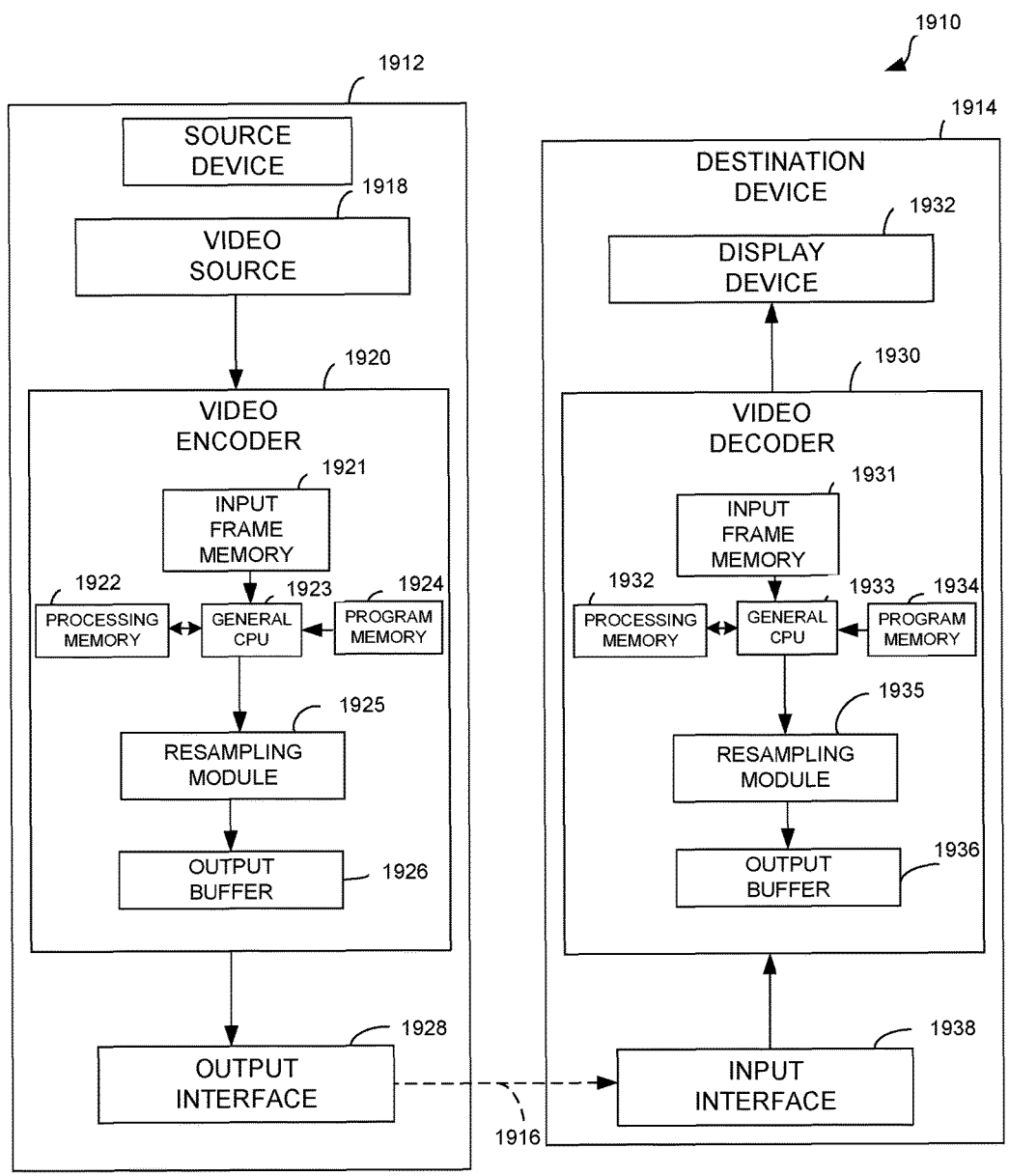
FIG. 19 depicts an exemplary embodiment of a coder/decoder system.

FIG. 19 is a high level view of a source device 1912 and destination device 1910 that may incorporate features of the systems and devices described herein. As shown in FIG. 19, example video coding system 1910 includes a source device 1912 and a destination device 1914 where, in this example, the source device 1912 generates encoded video data. Accordingly, source device 1912 may be referred to as a video encoding device. Destination device 1914 may decode the encoded video data generated by source device 1912. Accordingly, destination device 1914 may be referred to as a video decoding device. Source device 1912 and destination device 1914 may be examples of video coding devices.

Destination device 1914 may receive encoded video data from source device 1912 via a channel 1916. Channel 1916 may comprise a type of medium or device capable of moving the encoded video data from source device 1912 to destination device 1914. In one example, channel 1916 may comprise a communication medium that enables source device 1912 to transmit encoded video data directly to destination device 1914 in real-time.

In this example, source device 1912 may modulate the encoded video data according to a communication standard, such as a wireless communication protocol, and may transmit the modulated video data to destination device 1914. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 1912 to destination device 1914. In another example, channel 1916 may correspond to a storage medium that stores the encoded video data generated by source device 1912.

In the example of FIG. 19, source device 1912 includes a video source 1918, video encoder 1920, and an output interface 1922. In some cases, output interface 1928 may include a modulator/demodulator (modem) and/or a transmitter. In source device 1912, video source 1918 may include a source such as a video capture device, e.g., a video camera, a video archive containing previously captured video data, a video feed interface to receive video data from a video content provider, and/or a computer graphics system for generating video data, or a combination of such sources.

Video encoder 1920 may encode the captured, pre-captured, or computer-generated video data. An input image may be received by the video encoder 1920 and stored in the input frame memory 1921. The general purpose processor 1923 may load information from here and perform encoding. The program for driving the general purpose processor may be loaded from a storage device, such as the example memory modules depicted in FIG. 19. The general purpose processor may use processing memory 1922 to perform the encoding, and the output of the encoding information by the general processor may be stored in a buffer, such as output buffer 1926.

The video encoder 1920 may include a resampling module 1925 which may be configured to code (e.g., encode) video data in a scalable video coding scheme that defines at least one base layer and at least one enhancement layer. Resampling module 1925 may resample at least some video data as part of an encoding process, wherein resampling may be performed in an adaptive manner using resampling filters.

The encoded video data, e.g., a coded bit stream, may be transmitted directly to destination device 1914 via output interface 1928 of source device 1912. In the example of FIG. 19, destination device 1914 includes an input interface 1938, a video decoder 1930, and a display device 1932. In some cases, input interface 1928 may include a receiver and/or a modem. Input interface 1938 of destination device 1914 receives encoded video data over channel 1916. The encoded video data may include a variety of syntax elements generated by video encoder 1920 that represent the video data. Such syntax elements may be included with the encoded video data transmitted on a communication medium, stored on a storage medium, or stored a file server.

The encoded video data may also be stored onto a storage medium or a file server for later access by destination device 1914 for decoding and/or playback. For example, the coded bitstream may be temporarily stored in the input buffer 1931, then loaded in to the general purpose processor 1933. The program for driving the general purpose processor may be loaded from a storage device or memory. The general purpose processor may use a process memory 1932 to perform the decoding. The video decoder 1930 may also include a resampling module 1935 similar to the resampling module 1925 employed in the video encoder 1920.

FIG. 19 depicts the resampling module 1935 separately from the general purpose processor 1933, but it would be appreciated by one of skill in the art that the resampling function may be performed by a program executed by the general purpose processor, and the processing in the video encoder may be accomplished using one or more processors. The decoded image(s) may be stored in the output frame buffer 1936 and then sent out to the input interface 1938.

Display device 1938 may be integrated with or may be external to destination device 1914. In some examples, destination device 1914 may include an integrated display device and may also be configured to interface with an external display device. In other examples, destination device 1914 may be a display device. In general, display device 1938 displays the decoded video data to a user.

Video encoder 1920 and video decoder 1930 may operate according to a video compression standard. ITU-T VCEG (Q6/16) and ISO/IEC MPEG (JTC 1/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (WET) to evaluate compression technology designs proposed by their experts in this area. A recent capture of JVET development is described in the "Algorithm Description of Joint Exploration Test Model 5 (JEM 5)", JVET-E1001-V2, authored by J. Chen, E. Alshina, G. Sullivan, J. Ohm, J. Boyce.

Additionally or alternatively, video encoder 1920 and video decoder 1930 may operate according to other proprietary or industry standards that function with the disclosed JVET features. Thus, other standards such as the ITU-T H.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 1920 and video decoder 1930 may be implemented in hardware, software, firmware or any combination thereof. For example, the video encoder 1920 and decoder 1930 may employ one or more processors, digital signal processors (DSPs), application specific integrated circuits (ASICs), field programmable gate arrays (FPGAs), discrete logic, or any combinations thereof. When the video encoder 1920 and decoder 1930 are implemented partially in software, a device may store instructions for the software in a suitable, non-transitory computer-readable storage medium and may execute the instructions in hardware using one or more processors to perform the techniques of this disclosure. Each of video encoder 1920 and video decoder 1930 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general purpose processors 1923 and 1933 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 1923 and 1933.

A storage device may also store instructions, instructions, such as source code or binary code, for performing the techniques described above. A storage device may additionally store data used and manipulated by the computer processor. For example, a storage device in a video encoder 1920 or a video decoder 1930 may be a database that is accessed by computer system 1923 or 1933. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

The invention claimed is:

1. A method of decoding JVET video, comprising:
defining a plurality of coding unit (CU) templates within a decoded area of a video frame, each of the CU templates being positioned above and/or to the left of a current decoding position for which data was intra predicted and being spaced apart from the current decoding position by a different number of reference lines;
defining a search window within said decoded area for each of said plurality of CU templates, each search window being within an associated reference line;
generating a plurality of candidate prediction templates for each of said plurality of CU templates based on pixel values in the search window associated with the CU template, each of said plurality of candidate prediction templates being generated using different intra prediction modes;
calculating a matching cost between each of said plurality of CU templates and each of said plurality of candidate prediction templates;
selecting an intra prediction mode that generated the candidate prediction template that had the lowest matching cost relative to one of said plurality of CU templates; and
generating a prediction CU for said current decoding position based on said intra prediction mode.

2. The method of claim 1, wherein each of said plurality of CU templates is shaped with a row of pixels immediately above an associated reference line and a column of pixels immediately to the left of the associated reference line.

3. The method of claim 1, wherein calculating said matching costs comprises calculating the sum of absolute differences between the CU templates and their associated plurality of candidate prediction templates.

4. The method of claim 1, wherein each search window extend beyond the ends of the associated CU template.

5. The method of claim 1, wherein the steps of defining said CU templates and said search windows, calculating said matching costs, selecting said intra prediction mode, and generating said prediction CU based on said intra prediction mode are performed when information identifying an intra prediction mode for the current decoding position is absent from a bitstream.

6. The method of claim 1, further comprising adding said prediction CU to a reconstructed residual CU to generate a reconstructed CU for output video.

* * * * *